Patented June 12, 1928.

1,673,649

UNITED STATES PATENT OFFICE.

MERWYN C. TEAGUE, OF JACKSON HEIGHTS, NEW YORK, ASSIGNOR TO AMERICAN RUBBER COMPANY, OF BOSTON, MASSACHUSETTS, A CORPORATION OF MASSACHUSETTS.

METHOD OF MAKING RUBBER ARTICLES.

No Drawing.   Application filed July 25, 1925. Serial No. 46,163.

The use of rubber latex, and particularly of rubber latex containing compounding ingredients for various manufacturing purposes has come to occupy a position of considerable importance both in the manufacture of articles directly from rubber latex compositions and in the preparation of rubber coated materials and articles. In the manufacture of coated articles, as for example coated cloths of various sorts, paper and other fibrous associations, it is desirable to deposit the rubber thereon by the fewest possible number of applications of the rubber latex composition. In other words in many instances it is desirable to lay a relatively thick coating or film of rubber latex composition on a fabric or other supporting material in a single operation. To carry out such a coating process in a single operation, it is necessary to impart to the latex composition a uniform rate of drying in order to prevent the formation of films of rubber on the surface and thereby prevent the exit of moisture from within the body of latex composition.

The present invention has for its primary object a method of treating aqueous dispersions of rubber to cause moisture to pass from within the aqueous dispersion to the outside thereof uninterruptedly. Another object of the invention is to prevent the formation of films on the surface of bodies of rubber latex. Still another object is to provide a method for preventing the formation of surface films on rubber latex compositions containing a relatively large percentage of rubber.

With a particular embodiment in mind but without desiring to place undue limitations upon the scope of the invention beyond those which might be required by the prior art, the invention briefly stated consists in adding to a rubber dispersion such as rubber latex an agent through which moisture may pass uninterruptedly outwardly from within a body of rubber dispersion. The invention includes the treatment of latex with hydrophilic agents adapted to form passages through which moisture may pass outwardly between and around the rubber particles.

When a body of latex is exposed to the atmosphere or is heated to drive off moisture it so happens that the surface of the body of latex becomes covered with what appears to be a continuous film of rubber. This film either entirely prevents the further exit of moisture from the body of latex, or else greatly retards the exit of the moisture. The use of agents which are highly soluble in water or which have the property of readily absorbing water makes it possible to maintain an open path for the moisture within the body of latex. This tendency towards surface filming is not so marked where the latex or other dispersion of rubber contains a relatively large amount of compounding materials and therefore a small amount of rubber, for the reason that the compounding materials themselves serve to keep the rubber particles far enough apart so that moisture can pass between them during the drying operation. These compounding materials, such as the burnt clays, ground silica, and other well-known rubber compounding materials, cease to be effective in this respect when the amount of rubber is relatively high in proportion to the amount of compounding ingredient. What appears to happen is that the quantity of filling material is not sufficient in bulk to maintain the rubber particles in spaced relationship to each other. If, however, a water soluble or water absorptive agent be incorporated along with the compounding materials in a sufficient quantity, the water soluble or water absorptive agent does tend to keep the latex particles separated at the surface of the body of latex to a sufficient extent to permit the moisture within the body of latex to pass more or less uninterruptedly outward through the body of latex and into the atmosphere. In other words the uninterrupted passage of moisture through the surface of the body of latex prevents the formation of a film. This is of great importance in manufacturing for it permits the deposition of a relatively thick layer or coating of latex composition upon a supporting material such as fabric or other fibre, without retarding the rate of drying of the coating. It is believed that the water absorptive or water soluble agent, hereinafter called the hydrophilic agent, maintains canals or paths, which may be likened to a succession of minute sponges or blotters. The surface of the layer or body of latex or other rubber dispersion may be pictured as a heterogeneous mixture of rubber particles and molecules of the hydrophilic or antifilming agent. As examples of the effect of various agents upon the filming properties of latex, the following list may be given: A rubber latex composition containing 40% of solids films very readily and is somewhat difficult to dry uniformly throughout its mass. By adding any one of the materials hereinafter listed in the proportions specified to 100 parts of rubber as latex containing approximately 40% of solids, the filming tendency of the latex may be greatly reduced:

| | |
|---|---|
| Formaldehyde (37% solution) (the amount of ammonia for forming hexamethylenetetramine is not recorded) | 15 cc. |
| Glycerol | 15 parts |
| Saponin | 1 part |
| Sulphonated castor oil | 15 parts |
| Ammonium stearate (dried) | 12.5 parts |
| Ammonium caseinate | 15 parts |
| Ammonium soap of palm oil (including the glycerol) (dry) | 15 parts |
| Ammonium soap of linseed oil (including the glycerol) (dry) | 15 parts |
| Ammonium soap of cotton seed oil (including the glycerol) (dry) | 15 parts |
| Sodium silicate (52° Bé.) | 10 parts |
| Litharge | 15 parts |
| Lead thiosulphate | 3 parts |

(In each case 10 parts of 26% ammonium hydroxide was also added.)

The first four of the agents listed above, namely formaldehyde, glycerol, saponin, and sulphonated castor oil particularly have very strong anti-filming properties. The five ammonium compounds show but little difference among themselves, but are not quite as effective as the first four agents in the above list. The efficiency of the agents given above in preventing filming of the latex composition is approximately in the order in which the compounds are listed in the above table.

It is realized that many of these ingredients or hydrophilic agents as they are called in the claims have been previously employed in rubber and in rubber latex for other purposes and the invention does not aim to recite these materials as new ingredients for rubber latex. But it has been learned that addition of these materials, particularly the first four mentioned, to rubber latex or other aqueous dispersions of rubber which may or may not contain compounding ingredients, solve a very important problem in the manufacture of articles from rubber in aqueous suspensions, and the invention therefore possesses a high degree of utility and is of wide-spread application.

The invention is not limited to the materials above specified, but may be extended to other agents which have a suitable affinity for water, either by passing into solution, or by absorbing water, or have the property of transferring moisture through themselves.

Having thus described my invention, what I claim and desire to protect by Letters Patent is:

1. A method of making rubber articles from an aqueous dispersion of rubber which comprises disposing a body of the dispersion in a relatively thick layer in the presence of a hydrophilic agent, and exposing said body to drying conditions, whereby moisture is substantially uniformly withdrawn from all parts of said body without formation of a dried surface film.

2. A method of making rubber articles from an aqueous dispersion of rubber which comprises intermixing an aqueous dispersion of rubber and a hydrophilic agent, disposing the mixture in a relatively thick layer in a quiescent state, and exposing said body to drying conditions, whereby the moisture is substantially uniformly withdrawn from all parts of said body without formation of a dried surface film.

Signed at New York, county and State of New York, this 20th day of July, 1925.

MERWYN C. TEAGUE.